Patented Feb. 5, 1929.

1,700,982

UNITED STATES PATENT OFFICE.

WILLIAM H. HILL AND DAVID L. JACOBSON, OF PITTSBURGH, PENNSYLVANIA, ASSIGNORS TO THE KOPPERS COMPANY, OF PITTSBURGH, PENNSYLVANIA, A CORPORATION OF PENNSYLVANIA.

GAS-PURIFICATION SOLUTION AND PROCESS.

No Drawing.  Application filed July 13, 1925. Serial No. 43,415.

This invention relates in general to improvements in liquid purification of gases and especially to the revivification of solutions containing suspended metallic sulphides such as are derived from gas purification processes and is of especial utility in the regeneration of iron sulphide suspensions derived from such processes as are described in pending applications of Frederick W. Sperr, Jr., Serial No. 718,253, filed June 6, 1924, for process and apparatus for elimination of hydrogen sulphide in fuel gas; Frederick W. Sperr, Jr., and David L. Jacobson, Serial No. 730,676, filed August 7, 1924, for process and apparatus for liquid purification of fuel gas; Frederick W. Sperr, Jr., Serial No. 21,983, filed April 9, 1925, for aeration and gas purification process and apparatus; and David L. Jacobson, Serial No. 520,786, filed December 8, 1921.

In these processes, the regeneration of the suspension is accomplished by oxidation effected by treatment with air. We have discovered that humic acid or humus substances are of especial utility in hastening such oxidation.

The substances of a humic acid or humus composition may be naturally occurring or artificial, or substances may be used which can be converted to a humic acid; or materials may be used containing components (one or more) of a humic acid composition.

As examples of such materials, mention may be made of the solution resulting from the digestion of peat, lignite, or similar substances with alkalies, such as sodium carbonate or sodium hydroxide. The solid matter remaining is filtered off. This alkaline digestion may be carried out cold, or hot, and if desired with the aid of pressure. Other examples are materials such as waste sulphite liquor (from pulp manufacture) which contains bodies of humic acid composition; humic acid substances such as may be prepared from sugars by the action of acids, etc.; humic acid substances prepared from cellulose, for example by acid hydrolysis, or by heating under pressure; humic acid substances from the hydrolysis of albuminous or protein material; humic acid substances derived from phenolic substances having more than one hydroxyl group such as pyrogallol and protocatechuic acid, by oxidation, etc.; humic acid substances derived from furane such as by the action of hydrochloric acid; humic acid substances derived from lignin, for example, by treatment with alkalies with heat and pressure.

The suspension in which humic acid is used may be alkaline or neutral, and the oxidation may be carried out at atmospheric temperature or at higher temperatures. In alkaline suspensions, for example, the alkaline extract from peat may be used directly. In the case of neutral suspensions, the alkaline extract from peat is brought to the neutral point with acid and the neutral colloidal humic acid is added to the iron sulphide suspension that is to be oxidized.

The use of humic acid causes a certain amount of frothing. In some cases this will be found desirable. However, in any application of the principle where frothing is not desirable, any of the known antifrothing agents may be used (such as are used in flotation). For example, this frothing may be overcome by the addition of a suitable amount of kerosene or other petroleum oil.

The invention further consists in such other new and useful improvements, and has for further objects such other operative advantages or results, as may be found to obtain in the processes herein described or claimed.

As a specific example of the application of this invention, reference may be made to pending application of Frederick W. Sperr, Jr. and David L. Jacobson, Serial No. 730,676, filed August 7, 1924, hereinabove referred to, in which, broadly stated, the gas to be purified of hydrogen sulphide is brought into intimate and thorough contact with a sodium carbonate solution containing iron oxide capable of reacting to take up sulphur of absorbed hydrogen sulphide and forming iron sulphide which can be readily oxidized with formation of free sulphur. The spent liquor is subjected to aeration in such manner that the spent liquor is brought into intimate and thorough contact with finely atomized air, which regenerates the spent liquor so that it may be reused for purification of gas. Such regeneration actifies the spent liquor by oxidizing the iron and forming free sulphur, which sulphur floats to the surface. The entire process is conducted continuously and cyclically. The gas purification process is carried on exactly as described in this application except that we prepare the circulating liquid as follows:

100 gallons of a solution of sodium carbonate containing approximately 9% $Na_2CO_3$ are stirred with an equal volume of ground peat. The mixture is preferably kept warm during this operation. After thorough agitation the material is filtered, the peat is well washed,—the amount of wash water not exceeding 200 gallons. If less than 200 gallons of wash water are employed the filtered solution is diluted to the equivalent of this amount so that for every 100 gallons of the original 9% solution 300 gallons of filtered solution containing humic acid compounds are prepared. To this solution sufficient freshly precipitated ferric compound is added as described in the above mentioned application of Frederick W. Sperr, Jr. and David L. Jacobson, Serial No. 730,676, filed August 7, 1924, to make a suspension containing not over 1% equivalent of $Fe_2O_3$. This suspension is used exactly as described in said application, Serial No. 730,676, and analogous reactions occur. The humic acid and humus compounds not only facilitate oxidation of the ferric sulphide and the consequent regeneration of the suspension which is used as a purifying medium, but they also facilitate the reaction between the oxidized iron compounds and the alkaline sulphides which are formed on account of the action of the hydrogen sulphide on the alkali in solution.

In the operation of the process some mechanical losses occur due principally to the removal of sulphur to which part of the solution adheres. These losses must be replaced by adding additional sodium carbonate solution containing humic acid compounds prepared as described above.

We have also discovered that humic acid and humus compounds accelerate the action of catalytic substances such as cobalt and nickel compounds which are employed in gas purification processes as described in application of Yard, Rosenstein & Morgen, Serial No. 743,049, filed October 11, 1924.

The invention as hereinabove set forth or exemplified may be variously practiced or embodied within the scope of the claims hereinafter made.

We claim:

1. A process for purifying gases of hydrogen-sulphide which consists in: bringing the gas into contact with a solution containing a compound capable of reacting to take up sulphur of the absorbed hydrogen sulphide and containing a humus substance capable of accelerating the oxidation of the sulphided compounds when the spent liquor is subjected to oxidation.

2. A process as claimed in claim 1, in which the humus substance used is a humic acid.

3. A process for purifying gases of hydrogen-sulphide which consists in: bringing the gas into contact with a solution containing a compound capable of reacting to take up sulphur of the absorbed hydrogen-sulphide and containing a humus substance capable of accelerating the reactions between said compound and said sulphur and capable of accelerating the oxidation of the sulphided compounds when the spent liquor is subjected to oxidation.

4. A process as claimed in claim 3, in which the humus substance used is a humic acid.

5. A process for purifying gases of hydrogen-sulphide which consists in: bringing the gas into contact with a solution containing a compound capable of reacting to take up sulphur of absorbed hydrogen-sulphide and also containing a humus substance capable of accelerating the oxidation of the sulphided compounds; regenerating the spent liquor by aerating it to oxidize the sulphided compounds and form free sulphur; and reusing the aerated liquor for said purification of gas.

6. A process as claimed in claim 5, in which the solution used for purifying the gas is an alkaline solution, and the compound capable of reacting to take up sulphur of the absorbed hydrogen-sulphide is a metallic compound capable of forming a metallic sulphide which can be oxidized with formation of free sulphur.

7. A process as claimed in claim 5, in which the solution used for purifying the gas is a sodium carbonate solution and the compound capable of reacting to take up sulphur of the absorbed hydrogen-sulphide is a metallic compound capable of forming a metallic sulphide which can be oxidized with formation of free sulphur.

8. A process as claimed in claim 5, in which the solution used for purifying the gas is a sodium carbonate solution and the compound capable of reacting to take up sulphur of the absorbed hydrogen sulphide is an iron compound capable of forming iron sulphide which can be oxidized with formation of free sulphur.

9. In a process for liquid purification of gases involving the formation of metallic sulphide and reaction of metallic sulphide with oxygen, the improvement comprising the use of a humic acid in the liquid to accelerate reactions.

10. A solution for use in a cyclic process for liquid purification of gas, said solution having been prepared in manner and proportions substantially as follows: 100 gallons of a solution of sodium carbonate containing approximately 9 per cent $Na_2CO_3$ treated with an equal volume of ground peat, the mixture being kept warm during this operation; the mixture thoroughly agitated and then filtered, the peat well washed, the amount of wash water not to exceed 200 gallons, whereby to dilute said solution so that for every 100 gallons of the original 9 per cent solution 300 gallons of filtered solution containing humic acid compounds are prepared; then adding freshly precipitated ferric compound to make a suspension containing not over one per cent equivalent of $Fe_2O_3$; substantially as described.

11. In the revivification of solutions containing suspended metallic sulphides and derived from gas purification processes, the improvement comprising aerating said solutions in the presence of humus substances.

12. In the regeneration of solutions containing suspended iron sulphide and derived from gas purification processes, the improvement comprising aerating said solutions in the presence of humic acid.

13. In the revivification of alkaline solutions containing suspended metallic sulphides and derived from gas purification processes, the improvement comprising aerating said solutions in the presence of humus substances.

14. In the revivification of solutions containing suspended metallic sulphides and derived from gas purification processes, the improvement comprising aerating said solutions in the presence of humus substances, with recovery of free sulphur.

15. In a process for liquid purification of gases involving the formation of soluble sulphides and the revivifying of the soluble sulphides, in the presence of a compound of a metal whose sulphide is insoluble, with liberation of sulphur as free sulphur by a reaction with oxygen, the improvement comprising the use of a humic acid in the liquid to accelerate reactions.

In testimony whereof we have hereunto set our hands.

WILLIAM H. HILL.
DAVID L. JACOBSON.